United States Patent
Pigorini

(10) Patent No.: US 8,413,468 B2
(45) Date of Patent: Apr. 9, 2013

(54) GLASSWARE FORMING MACHINE POWERED MOLD HANDLING DEVICE, AND FORMING MACHINE FEATURING SUCH A DEVICE

(75) Inventor: Fabio Pigorini, Tortona (IT)

(73) Assignee: Bottero S.p.A., Cuneo (IT)

( * ) Notice: Subject to any disclaimer, the term of this patent is extended or adjusted under 35 U.S.C. 154(b) by 0 days.

(21) Appl. No.: 13/027,794

(22) Filed: Feb. 15, 2011

(65) Prior Publication Data

US 2011/0226018 A1    Sep. 22, 2011

(30) Foreign Application Priority Data

Feb. 15, 2010    (IT)  .............................. TO2010A0108

(51) Int. Cl.
    *C03B 35/04*    (2006.01)
(52) U.S. Cl. ........................................ 65/361
(58) Field of Classification Search ..................... 65/361
    See application file for complete search history.

(56) References Cited

U.S. PATENT DOCUMENTS

| 1,705,955 | A | * | 3/1929 | Barker, Jr. .................. 65/260 |
| 4,367,087 | A | * | 1/1983 | Cardenas Franco et al. ... 65/163 |
| 4,445,923 | A | * | 5/1984 | Shetterly ..................... 65/158 |
| 4,708,578 | A |   | 11/1987 | Richter ........................ 414/720 |
| 4,793,848 | A |   | 12/1988 | Nebelung ...................... 65/225 |
| 4,892,183 | A | * | 1/1990 | Fenton ......................... 198/468.3 |
| 6,367,287 | B1 | * | 4/2002 | Leidy et al. .................. 65/160 |
| 6,520,319 | B2 | * | 2/2003 | Borsarelli et al. ........ 198/750.11 |

FOREIGN PATENT DOCUMENTS

| EP | 2360125 A1 | 8/2011 |
| FR | 2 440 270 | 5/1980 |

OTHER PUBLICATIONS

Italian Search Report dated Nov. 10, 2010 from corresponding IT Application No. TO20100108.
Communication dated Sep. 21, 2012 from corresponding EP Application No. 11154587.7, 8 pages, concerning a third party submission.

* cited by examiner

*Primary Examiner* — Jason L Lazorcik
*Assistant Examiner* — Cynthia Szewczyk
(74) *Attorney, Agent, or Firm* — Ohlandt, Greeley, Ruggiero, and Perle, L.L.P.

(57) ABSTRACT

In a glassware forming machine, a mold is moved to and from a work position by a device having a supporting structure connected to an overhead frame of the machine; a gripping head for engaging the mold; a cable transmission having a cable operated by a winch and connected to the gripping head to move the gripping head to and from the supporting structure in a substantially vertical direction; and a powered articulated arm connected to the gripping head and to the supporting structure to exert substantially horizontal forces on the gripping head.

18 Claims, 4 Drawing Sheets

GLASSWARE FORMING MACHINE POWERED MOLD HANDLING DEVICE, AND FORMING MACHINE FEATURING SUCH A DEVICE

The present invention relates to a glassware forming machine powered mold handling device.

BACKGROUND OF THE INVENTION

In glassware manufacturing, so-called I.S. forming machines are used, which comprise a number of side by side forming sections, each for producing a succession of glass articles.

Each forming section comprises one or more rough molds and one or more finish molds, each of which comprises two half-molds movable with respect to each other between a closed position defining respective molding cavities, and an open position in which to remove the molded article.

The molds are selected according to the type of article for manufacture, and must therefore be changed at each production change, or whenever they fail to ensure the desired surface and/or dimensional quality of the product.

Changing the molds is a time-consuming job that calls for considerable physical strength. Besides having to handle heavy parts that are awkward to grip (some molds can weigh as much as sixty-seventy kilograms), workers are also forced to work in extremely unfavourable conditions, i.e. to remove and replace molds in areas some distance from the edge of the machine bed and to which access is also hampered by other component parts of the machine.

One known solution to the problem is to use lever-operated devices or controlled-axis, e.g. anthropomorphic, manipulators floor-mounted alongside the machine.

This solution makes the molds easier to change, but increases the necessary floor space, by requiring aisles and safety operating areas for the manipulators, and also greatly increases the cost of the machine, so much so that operators continue to opt for manual mold changing solutions.

This is mainly due to the manipulators having to be stable with respect to the structure of the machine, and extremely rigid to handle heavy overhanging weights, to move them along complex, strictly defined trajectories, and to deposit them in strictly defined positions. As a result, manipulators are invariably heavy, bulky, complicated in design, and extremely expensive. By way of example, an anthropomorphic manipulator with a reach of roughly 2000 millimetres weighs roughly fifteen times the load it moves.

SUMMARY OF THE INVENTION

It is an object of the present invention to provide a glassware forming machine mold handling device designed to provide a simple, low-cost solution to the above problems.

According to the present invention, there is provided a glassware forming machine mold handling device, the device comprising a supporting structure; a gripping head for engaging a mold; powered cable handling means connected to said gripping head to move the gripping head to and from said supporting structure in a substantially vertical direction; and a powered articulated arm connected to said gripping head and to said supporting structure to exert substantially horizontal forces on said gripping head.

In the device defined above, the cable handling means preferably comprise a powered winch, and a cable operated by said winch.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
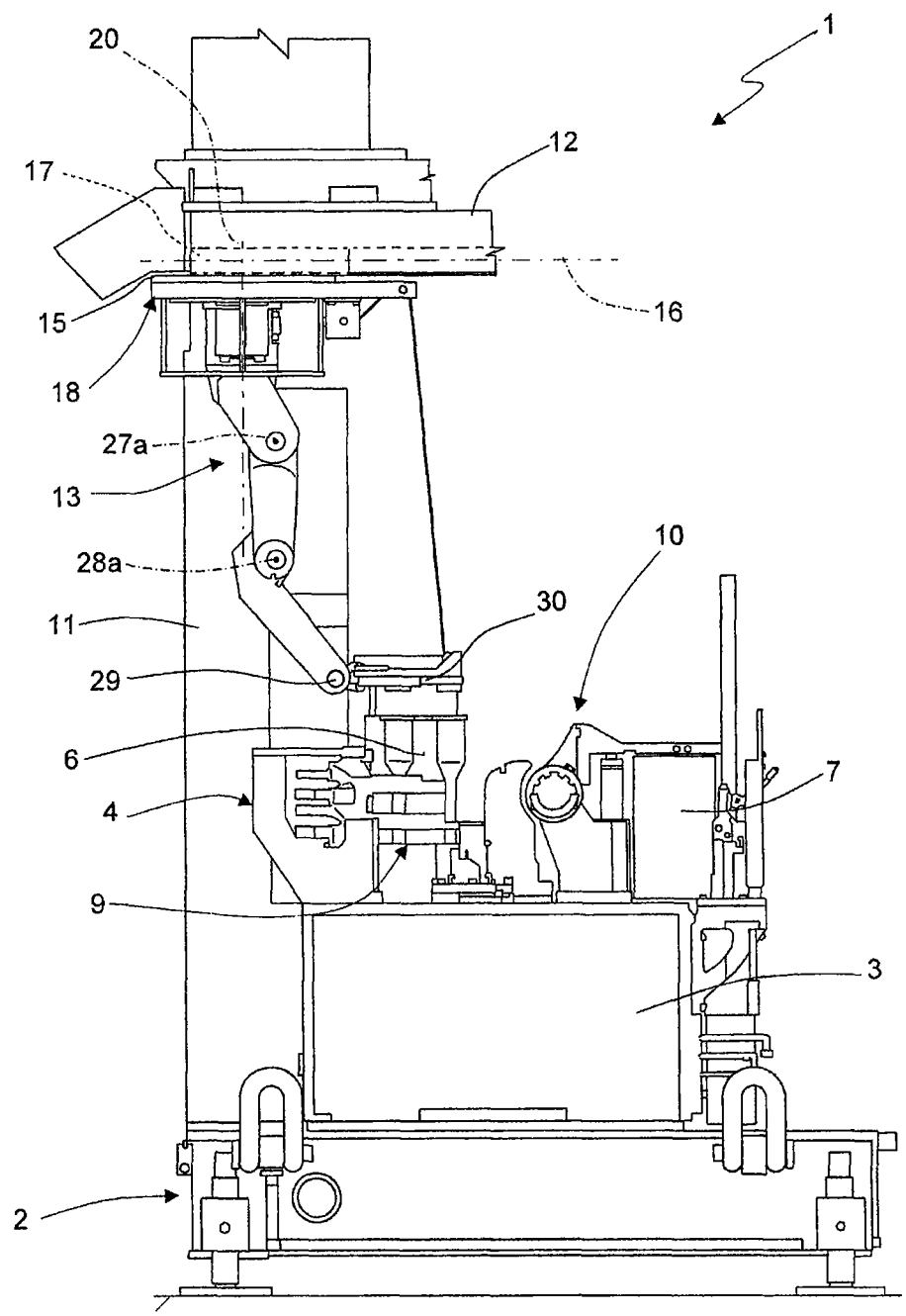
FIG. 1 shows a schematic side view, with parts removed for clarity, of a glassware forming section in accordance with the teachings of the present invention.

Number 1 in FIG. 1 indicates as a whole a glassware forming section comprising a bed 2; a gear housing 3 supported on bed 2; and a mold assembly 4 on top of housing 3. Mold assembly 4 in turn comprises a rough mold 6 and a finish mold 7, each comprising two half-molds moved with respect to other by respective actuating devices 9, of which only the actuating device 9 of rough mold 6 is shown in FIG. 1.

Invert assembly 10, located between rough mold 6 and finish mold 7 on housing 3, transfers the semifinished articles from rough mold 6 to finish mold 7.

As shown in FIG. 1, a column or upright 11 extends upwards from bed 2, and terminates at the top with a horizontal cross member 12, which extends over molds 6 and 7, and to which is suspended a mold handling device 13 for handling molds 6, 7 when mounting them to the forming section or changing them for production-change or maintenance purposes.

Figure 2:
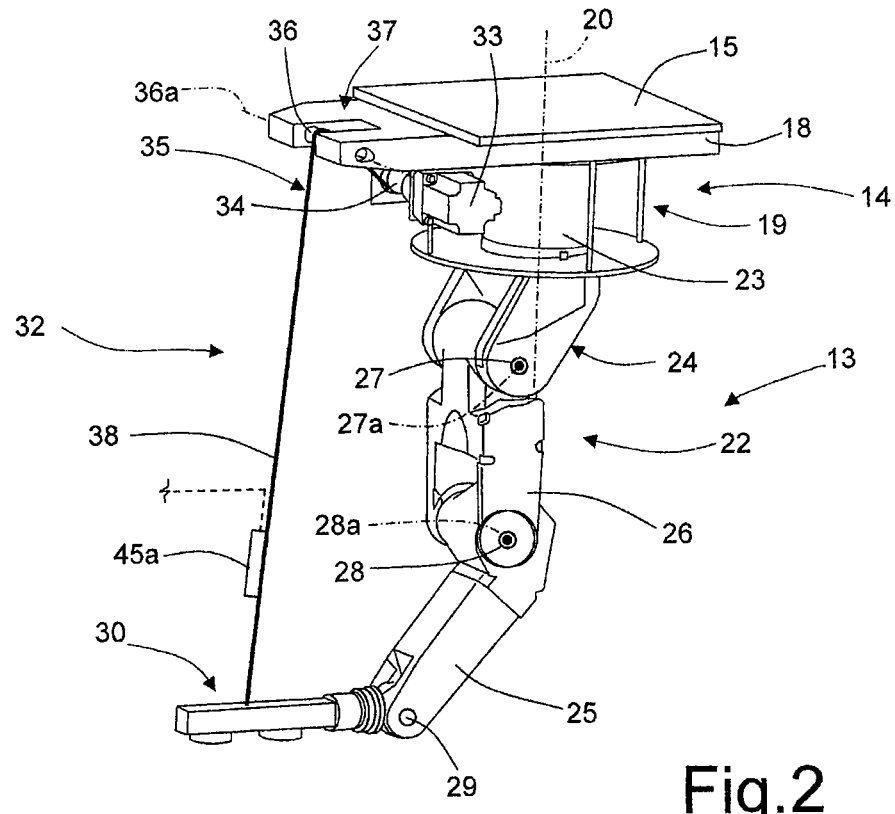
FIG. 2 shows a larger-scale view in perspective of a device in FIG. 1 in accordance with the teachings of the present invention.

With reference to FIG. 1 and particularly FIG. 2, device 13 comprises a supporting frame 14, in turn comprising a connecting plate 15, which is connected to cross member 12 either directly and firmly, substantially over relative mold 6, 7, or by means of a known guide-slide assembly 17 (shown by the dash line in FIG. 1 and not described in detail) which allows device 13 to slide in a substantially horizontal direction 16 (FIG. 1) parallel to the moving direction of the semifinished articles in forming section 1.

Regardless of how plate 15 is connected to cross member 12, supporting frame 14 also comprises a movable structure 18 connected to plate 15 by a powered hinge or pivot 19 enabling structure 18 to rotate with respect to plate 15 about a substantially vertical axis 20 perpendicular to direction 16.

As shown in FIGS. 1 and 2, an operating arm 22 is suspended from structure 18, and has one end 23 connected integrally to structure 18 and conveniently coaxial with axis 20.

In the example shown, arm 22 is a powered articulated arm comprising a fork 24, connected integrally to end 23, and an attachment end portion 25, which are hinged to opposite end portions of an intermediate arm 26 by respective known powered joints 27, 28 controlled by a control unit 46 to rotate about respective parallel horizontal axes 27a, 28a. A conveniently magnetic or mechanical lock-on or gripping head 30, for positively engaging molds 6 and 7, is hinged to the free end of end portion 25 by a powered cylindrical joint 29 with a hinge axis parallel to axes 27a, 28a.

In a variation not shown, cylindrical joint 29 is replaced with a spherical wrist enabling gripping head 30 to rotate about any axis and so simplify pickup and release of the molds. Rotation of the spherical wrist, however, is limited, to ensure the torques transmitted to the wrist do not exceed the maximum torques withstandable by the arm joints.

As shown in FIGS. 1 and 2, device 13 also comprises a cable transmission 32 for lifting molds 6, 7 as described below. Cable transmission 32 comprises a powered winch 33 fitted integrally to structure 18, alongside end 23, and comprising a drum 34 wound with a cable 35 connected firmly at its free end to gripping head 30. The cable 35 unwound off drum 34 runs over and is diverted towards head 30 by an idle roller 36 fitted to a fork 37 of structure 18 to rotate about a horizontal axis 36a parallel to axes 27a, 28a, and has a substantially vertical portion 38 extending between roller 36 and head 30 and facing arm 22.

Figure 3:
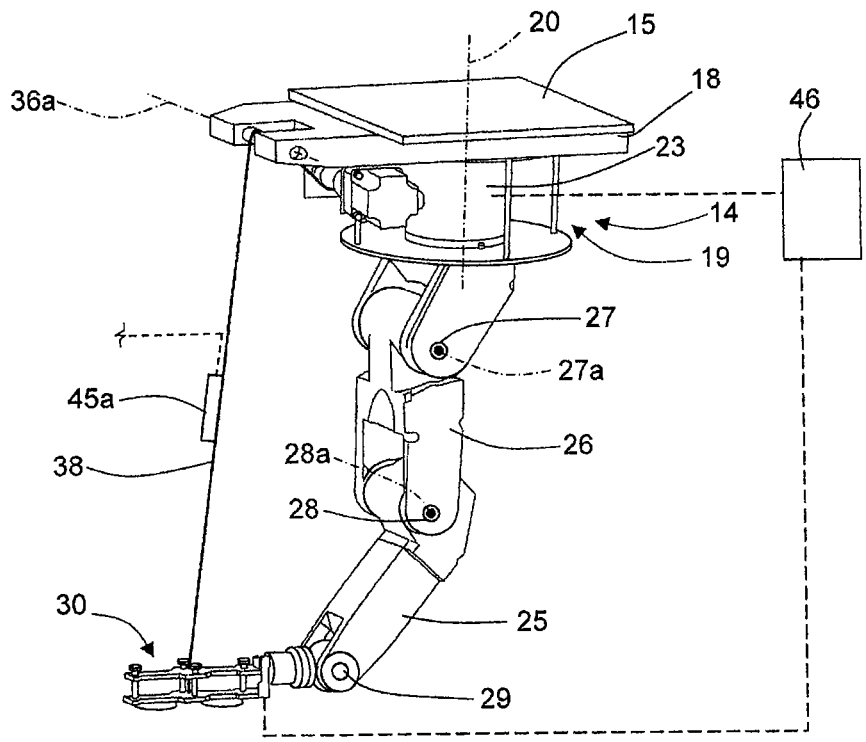
FIG. 3 shows the same view as in FIG. 2, of a variation of a detail in FIG. 2.
Figure 4:
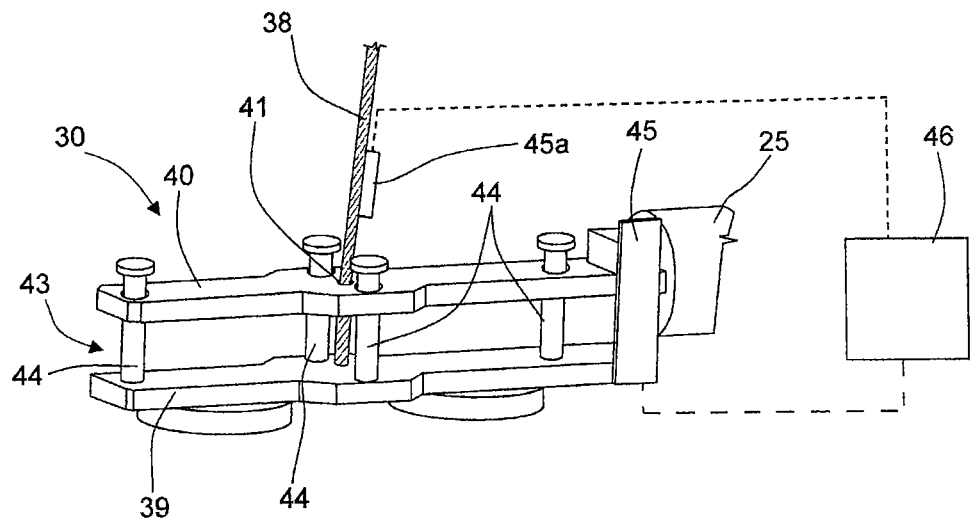
FIG. 4 shows a larger-scale view in perspective of a detail in FIG. 3.

In FIG. 2, head 30 is defined by a non-deformable block. Alternatively, as shown in FIGS. 3 and 4, head 30 is adaptable or flexible by cable 35. More specifically, head 30 comprises two parallel plates 39, 40 positioned one over the other, a given distance apart. Plate 40 is hinged to end portion 25 by joint 29, and has a through opening 41 fitted through loosely with an end portion of cable 35, the free end of which is connected integrally to a barycentric point of plate 39, beneath opening 41. Plate 39, which is fitted with the mold engaging members, is connected to plate 40 by a guide-slide assembly 43 enabling plate 39 to move vertically with respect to plate 40. In the example described and shown in FIG. 4, assembly 43 comprises a number of parallel vertical guide pins 44 connected integrally to plate 39, and which slide inside respective holes in plate 40; and a number of spacer springs (not shown) interposed between and for keeping plates 39 and 40 apart.

Movement of plate 39 with respect to plate 40 is detected by a position transducer 45 connected electrically to control unit 46 of device 13 (FIGS. 3 and 4). More specifically, the measurement by transducer 45 is read by unit 46 and used to coordinate operation of winch 33 and arm 22, so the distance between plates 39 and 40 remains within a given range.

In a variation, in addition to or instead of transducer 45, a force transducer 45a is interposed between cable 35 and gripping head 30 to determine the tension of cable 35. The measurement by transducer 45a is sent to unit 46 and used to coordinate operation of winch 33 and arm 22, to keep the torque exerted on joints 27, 28, 29 of arm 22 below the maximum permissible torque of arm 22.

Figure 5:
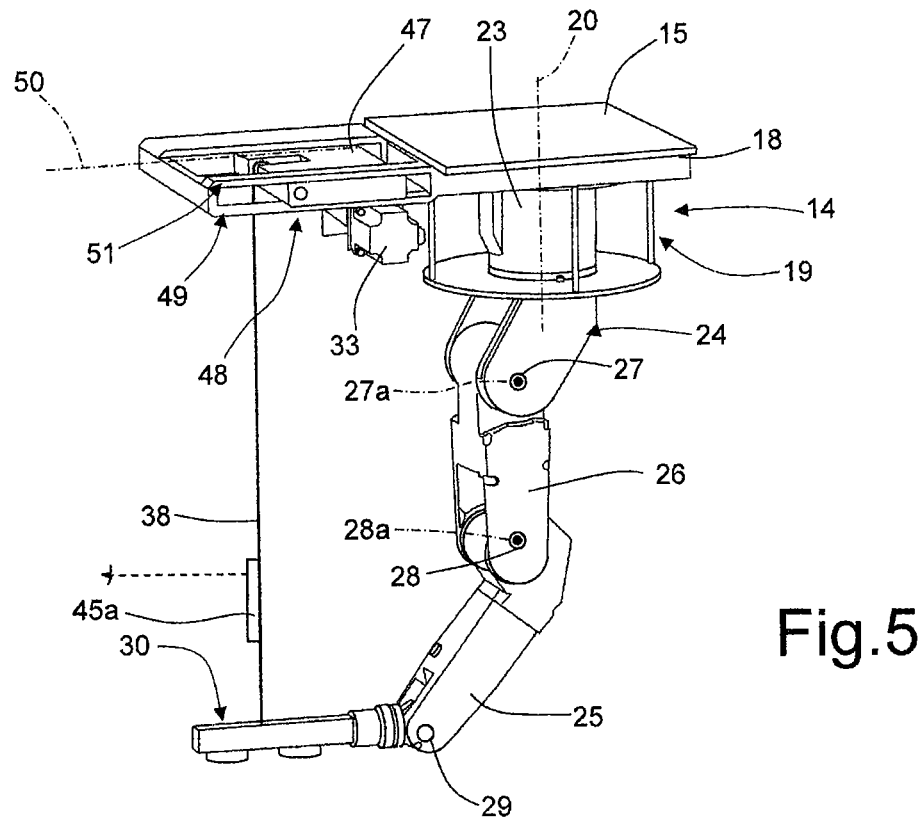
FIG. 5 shows the same view as in FIG. 3, of a variation of a further detail in FIG. 3.

In the FIG. 5 variation, winch 33 and idle roller 36 are connected in fixed relative positions to a slide 47 of a guide-slide assembly 48 positioned over head 30 and having a guide 49 fitted to structure 18 to guide slide 47 in a direction 50 perpendicular to axes 20, 27a, 28a. In the example shown, guide 49 is defined by two slots 51 engaged in sliding manner by opposite lateral portions of slide 47, which is defined by a straightforward platelike body.

Figure 6:
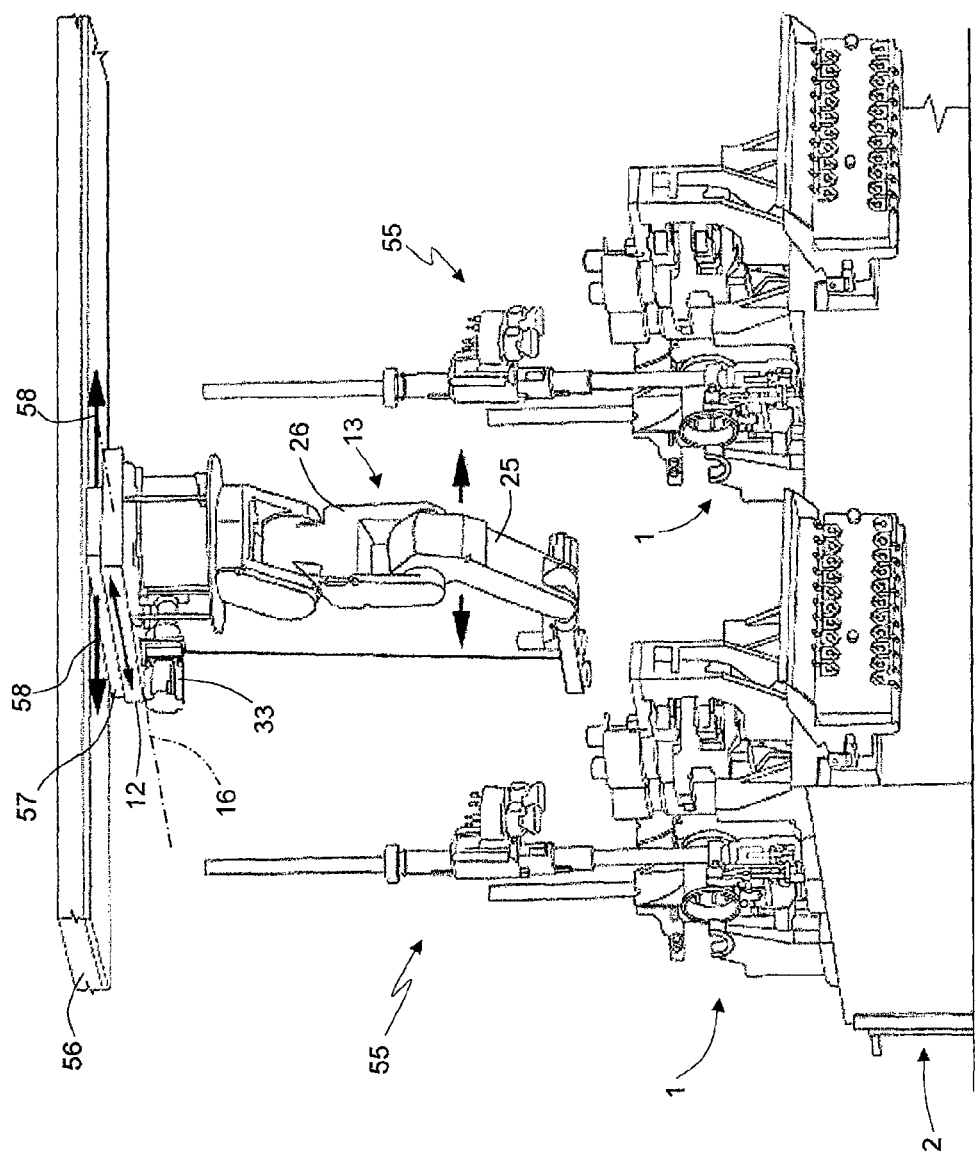
FIG. 6 shows a schematic view in perspective of a glassware forming machine in accordance with the teachings of the present invention.

FIG. 6 shows schematically a so-called I.S. glassware forming machine indicated as a whole by 55. Machine 55 comprises two or more forming sections 1 (only two shown in FIG. 6); and one mold handling device 13, the cross member 12 of which is fitted to an overhead longitudinal member 56—shared by all the forming sections 1 and extending perpendicular to cross member 12—by a further known guide-slide assembly 57 (not described in detail) which allows cross member 12, and therefore the whole of device 13, to move in a direction 58 perpendicular to direction 16 and to the moving directions of the semifinished articles in sections 1.

In actual use, considering one section 1 and one mold 6 to be removed from section 1 for the sake of simplicity, connecting plate 15 of device 13 is moved in direction 16 and/or movable structure 18 is rotated about axis 20 to first position head 30 over mold 6, and then attach head 30 to mold 6 by coordinating operation of winch 33 and operating arm 22. As soon as head 30 is positively connected to it, mold 6, released from relative actuating device 9, is eased out of section 1 by lifting it vertically by means of winch 33, and by simultaneously or subsequently exerting thrust or pull on head 30 in substantially horizontal directions perpendicular to cable portion 38, i.e. in substantially horizontal planes, by rotating arm 22 in coordination with movement of winch 33, so that mold 6 is removed along any trajectories, either predefined or selected according to the design of section 1.

In device 13 described, cable 35 therefore supports the whole weight of the mold, while articulated arm 22 serves solely to exert horizontal thrust/pull to move the mold laterally. Being relieved of any weight, and performing no lifting function, articulated arm 22 is therefore designed solely to push or pull a load suspended from a cable, and, as such, can be much simpler in terms of design, structure, and operation, and much smaller than currently used anthropomorphic or equivalent mold handling manipulators.

In the event of cable portion 38 deviating from its substantially vertical position and so exerting vertical forces on articulated arm 22 when moving the mold, this is prevented by the particular design of head 30 and/or the presence of guide-slide assembly 48 on structure 18. That is, assembly 48 allows winch 33 and roller 36 to move with respect to head 30 to eliminate any horizontal force components caused by less than perfect verticality of portion 38 of cable 35, while the movement of plate 39 towards plate 40 absorbs and eliminates the vertical components transmitted by cable 35 to head 30.

As regards the size of section 1, the setup of device 13, i.e. suspended from a cross member over the molds, provides for achieving automated mold change sections 1 of exactly the same area as forming sections with no automated mold change equipment.

From the cost standpoint, device 13 described is obviously extremely straightforward in terms of design and control, and so only marginally affects the overall cost of the forming section. And using one device 13 shared by all the forming sections on the machine further reduces the effect of device 13 on the overall cost of the machine.

Clearly, changes may be made to device 13 as described herein without, however, departing from the protective scope defined in the independent Claims. In particular, arm 22 may be designed differently from the one described. For example, it may comprise telescopic portions, while still being designed to only exert horizontal forces, leaving the lifting function, i.e. vertical forces, to cable transmission 32.

Similarly, transmission 32 may differ from the one described and comprise, for example, strain reducers to reduce, if necessary or convenient, the force exerted by winch 33, or to permit the use of smaller winches.

The invention claimed is:
1. A glassware forming machine mold handling device, the device comprising a supporting frame; a gripping head for engaging a mold; powered cable handling means connected to said gripping head to move the gripping head to and from said supporting frame in a substantially vertical direction; and a powered articulated arm connected to said gripping head and to said supporting frame to exert substantially horizontal forces on said gripping head, wherein said cable handling means comprise a powered winch, and a cable operated by said winch.

2. A device as claimed in claim 1, wherein said cable is connected directly to said gripping head, and said winch is connected to said supporting frame.

3. A device as claimed in claim 1, wherein said cable extends at least partly positioned along the length of said articulated arm.

4. A device as claimed in claim 1, further comprising detecting means for detecting the tension of said cable; and control means for controlling said winch and said articulated arm, in response to a signal from said detecting means, to limit the torques on said articulated arm.

5. A device as claimed in claim 1, further comprising a movable structure associated with said supporting frame and connectable to a connecting plate.

6. A device as claimed in claim 5, wherein said movable structure comprises pivot means to enable said supporting frame to rotate in opposite directions about a substantially vertical axis with respect to said connecting plate; said articulated arm being suspended beneath said supporting frame.

7. A device as claimed in claim 5, wherein said movable structure comprises at least a guide-slide assembly.

8. A device as claimed in claim 1, wherein said cable handling means further comprises a drum and/or idle roller for guiding said cable, said drum and/or idle roller rotating with respect to said supporting frame about a substantially horizontal axis.

9. A device as claimed in claim 8, wherein said drum and/or idle roller is hinged to said supporting frame to rotate about a fixed horizontal hinge axis on said supporting frame.

10. A device as claimed in claim 8, further comprising a further guide-slide assembly interposed between said cable handling means and said supporting frame, said further guide-slide assembly comprising a slide which slides both ways in a substantially horizontal direction with respect to said supporting frame, wherein said cable, said powered winch and said drum and/or idle roller are fitted to said slide.

11. A device as claimed in claim 1, wherein said gripping head comprises a first portion connected directly to one end of said cable, and a second portion facing said first portion, fitted through with said cable, said second portion being connected directly to one end of said articulated arm, the device further comprising a guide-slide assembly being interposed between said first and second portion to allow the first and second portion to move with respect to each other.

12. A device as claimed in claim 11, wherein said guide-slide assembly enables movement of said first portion with respect to said second portion in a substantially vertical direction.

13. A device as claimed in claim 11, wherein said gripping head also comprises transducer means for determining the relative position of said first and second portion.

14. A glassware forming section comprising a bed, and at least one glassware mold on top of said bed, the section being characterized by also comprising a connecting plate above said mold, the glassware forming section also comprising a mold handling device suspended from said connecting plate claimed in claim 1 and a movable structure interposed between said connecting plate and said supporting frame.

15. A section as claimed in claim 14, wherein said movable structure comprises a pivot enabling rotation of the supporting frame of said device with respect to said connecting plate about a substantially vertical axis.

16. A section as claimed in claim 14, wherein said movable structure comprises at least a guide-slide assembly.

17. A section as claimed in claim 16, wherein said movable structure comprises two guide-slide assemblies for moving said supporting frame in two intersecting substantially horizontal directions.

18. A glassware forming machine comprising at least two forming sections, each comprising a bed, and at least one glassware mold on top of said bed, the machine being characterized by comprising a connecting plate shared by said forming sections and above said molds, the machine having at least one mold handling device shared by said forming sections, suspended from said connecting plate as claimed in claim 1, and a movable structure interposed between said connecting plate and said supporting frame, said movable structure comprising at least one guide shared by said forming sections and for moving said device from one forming section to the other.

* * * * *